Sept. 27, 1966 N. L. STAUFFER 3,276,030
ELECTRICAL APPARATUS
Filed March 23, 1965
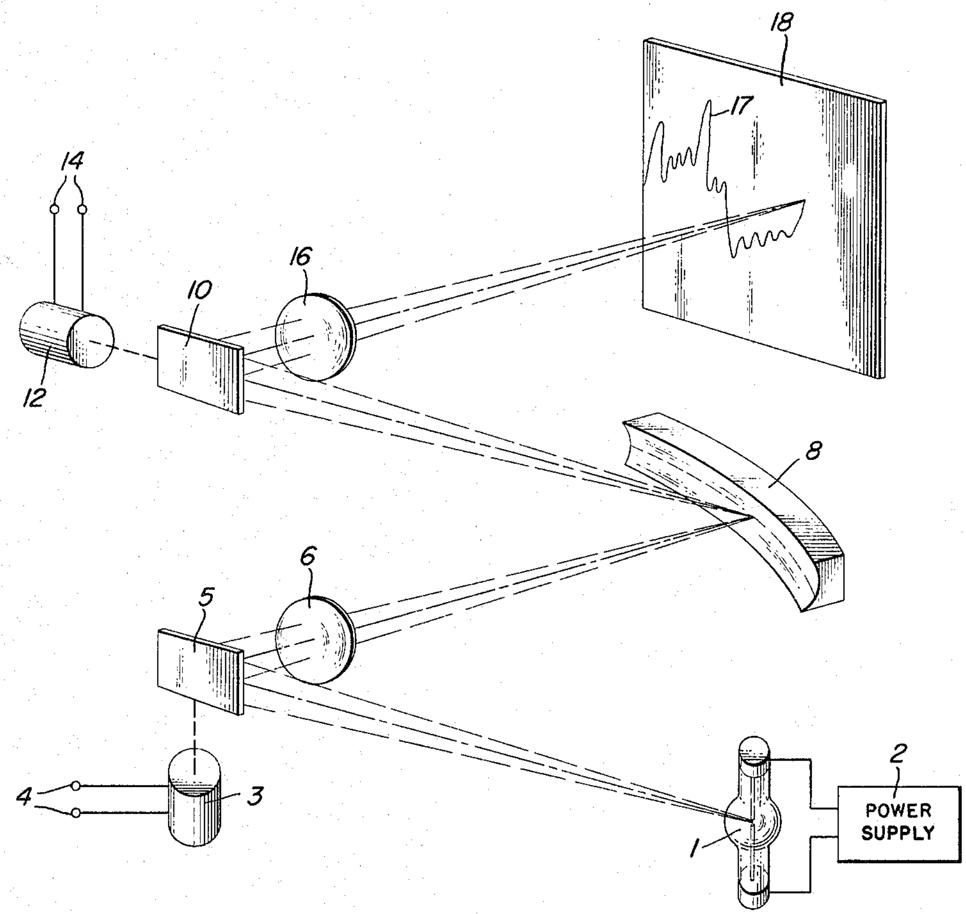
INVENTOR.
NORMAN L. STAUFFER
BY Arthur H. Swanson
ATTORNEY.

United States Patent Office 3,276,030

Patented Sept. 27, 1966

3,276,030

ELECTRICAL APPARATUS

Norman L. Stauffer, Englewood, Colo., assignor to Honeywell Inc., Minneapolis, Minn., a corporation of Delaware Filed Mar. 23, 1965, Ser. No. 442,014
4 Claims. (Cl. 346—29)

This invention relates to electrical recording devices. More specifically, the present invention relates to galvanometric recording devices.

An object of the present invention is to provide an improved galvanometric recording device for two axis recording.

Another object of the present invention is to provide an improved two recording axis galvanometric recorder having similar recording speeds for both axis.

Still another object of the present invention is to provide an improved two recording axis galvanometric recorder having similar and interchangeable galvanometer devices for both recording axis.

A further object of the present invention is to provide a novel optical system for a two recording axis galvanometric recorder which uses a minimum size galvanometer mirror for both galvanometer movements for maximum recording speeds on both axis.

A still further object of the present invention is to provide an improved two recording axis galvanometric recorder, as set forth herein, having a simple operation and construction.

In accomplishing these and other objects, there has been provided, in accordance with the present invention, a two axis recorder using a pair of mirrors individually driven by galvanometer movements with their respective axis of motion at right angles to each other. A spherical reflector is used to reflect light beams from one mirror to the other and to form an image of a light source on the second mirror. A recording surface is provided to intercept the light beams reflected from the second mirrors to provide a representation of the two-axis recording. An optical lens system is arranged to focus the image of the light source on the recording surface as a recording image.

A better understanding of the present invention may be had when the following detailed description, is read in connection with the accompanying drawing, in which the single figure is a pictorial representation of a two axis recorder embodying the present invention.

Referring to the single figure drawing in more detail, there is shown a two axis galvanometric recorder having a source of recording illumination 1; e.g., an arc light, energized by a power supply 2. A first galvanometer movement 3 is connected to a first pair of input terminals 4. A first mirror 5 is mounted on the first movement 3 for oscillation by the movement 3 in response to signals applied to the input terminals 4. A first spherical lens 6 is arranged in front of the mirror 5 to form an image of the source 1. The focused image of the source 1; formed by lens 6, is arranged to fall on the surface of a spherical mirror 8.

The mirror 8 is positioned to reflect the focused image formed by the lens 6 onto a second mirror 10. The reflected from the second mirror 10. The focusing action in the same plane as the reflecting surface of the first mirror 5. The mirror 10 is mounted on a second galvanometer movement 12 which is connected to a second pair of input terminals 14. The second input terminals 14 are arranged to be connected to a second source of input signals. Further, the second movement 12 is arranged to produce an oscillation of the second mirror 10 about an axis at right angles to the axis of oscillation of the first mirror 5. A second spherical lens 16 is positioned in front of the second mirror 10 to focus the light rays reflected from the second mirror 10. The focussing action of the second lens 16 is effective to produce a focused image of the source 1 as it is reflected from the spherical mirror 8, for forming a trace 17 on a readout medium 18. The readout medium 18 may be any suitable recording surface such as photographic film or photosensitive paper. Additionally, the readout surface 18 may be a display surface, such as a fluorescent coating having a measure of persistance to produce a visual indication of the applied input signals. Other readout devices for use as the surface 18 may occur to those skilled in the art without departing from the scope of the present invention.

In operation, the present invention is effective to provide a two axis recording apparatus; e.g., an X–Y recorder using separate input signals for obtaining a resultant curve wherein each input signal is independent from the other. These input signals are individually applied to input terminals 4 and 14. The input signal applied to the first input terminals 4 may be a cyclically repetitive oscillation which will produce an oscillation of the first mirror 5 by the movement 3. This oscillation of the mirror 5 would be effective to sweep the recording image transversely across the recording surface 18 on a so-called X-axis. The recording image is a point of light obtained from the light source 1. The light beams from the source 1 are focused by the optical system of the recorder into a recording image suitable for activating the recording surface 18.

After the light beams leave the first mirror 5, they are focused by lens 6 onto the spherical mirror 8 and reflected therefrom onto a second galvanometer mirror 10. The second mirror 10 is oscillated by its driving movement 12 in response to a second input signal applied to input terminals 14. The axis of oscillation of the second mirror 10 is arranged to be at right angles to that of the first mirror 5. Thus, the light beams are positioned longitudinally on the surface 18 by the second mirror 10. Since the transverse and longitudinal positioning of the recording image occur simultaneously and independently, the recording image is effective to trace an X–Y recording representation 17 on the surface 18.

In order to maintain the speed response of the recorder at a maximum level in both the X and Y axis, it is necessary to have both the first mirror 5 and the second mirror 10 as small as possible to reduce the inertia of the moving systems. Further, in order to enhance the practical effectiveness of the recorder structure, it is desirable to have the galvanometer devices as interchangeable elements to avoid the need for supplying and stocking two separate devices. However, as the recording image is moved by the first mirror 5, it is necessary to have a maximum transverse sweep to fully utilize the surface 18. Such a maximum sweep would ordinarily drive the recording image off the second mirror 10 at its extreme excursions unless this mirror was made with a larger dimension along the sweep axis. Such an enlargement of the second mirror 10 would increase its inertia and reduce the frequency response of the recorder. Further this modification would make the galvanometer devices non-interchangeable.

The apparatus of the present invention is effective to obviate the need for enlarging the second mirror 10 by providing a spherical reflector 8 to form the recording image on the second mirror 10. The spherical reflector 8 has a radius of curvature equal to the distance from the mirror to the galvanometer mirrors 5 and 10 and is positioned to form a stationary image of the first mirror 5 on the second mirror 10. The deflection of the first mirror 5 does not alter the position of this image on the second mirror 10 but it does change the position of the image on the spherical mirror 8 which is the effective source for the light beams going to the second mirror 10. The motion of the first mirror 5, thus, is effective to change the position of the recording image along a X-axis which is superimposed on the Y-axis motion. The first lens 6 is arranged to form a focused image of the source 1 on the spherical mirror 8 while the second lens 16 is effective to re-focus this image on the surface 18 as a recording image. The movement of the focused image of the source 1 on the spherical mirror 8 is effective to produce a transverse motion of the trace 17 on the recording surface 18 independent of the longitudinal movement imparted thereto by the motion of the second mirror 10.

Accordingly, it may be seen that there has been provided, in accordance with the present invention, an improved X–Y galvanometric recorder having a maximum recording speed on both axis and featuring interchangeable galvanometer recording devices.

What is claimed is:

1. A two axis recorder comprising a first mirror arranged to be driven about an axis by a first input signal, a source of recording radiation arranged to illuminate said mirror, a second mirror arranged to be driven about an axis by a second input signal, said axes arranged at right angles to each other, a spherical reflector arranged to intercept radiation reflected from said first mirror, lens means arranged for forming a first focused image of said source of recording radiation upon the surface of said spherical reflector, said spherical reflector being operably arranged for continuously reflecting said first focused image of said recording radiation as said image is transversely displaced across the surface thereof by the motion of said first mirror about its axis, said spherical reflector being further arranged for reflecting said first focused image toward said second mirror, a recording means arranged to intercept radiation reflected from said second mirror, and second lens means arranged to focus said first focused image upon said recording means forming a second focused image thereon, whereby said motion of said first mirror imparts a transverse motion to said first focused image upon said spherical reflector for reflection upon said second mirror and therefrom to said recording means for producing a transvesely moving second focused image thereon and said motion of said second mirror imparts an independent longitudinal displacement to said transversely moving second focused image for forming an X–Y recording on said recording means.

2. A two axis recorder as set forth in claim 1 wherein said first and second mirrors and said spherical reflector are arranged to provide an X–Y recording having a maximum transverse sweep across said recording means.

3. A two axis recorder comprising a light source, a first galvanometer driven mirror arranged to reflect light from said source, a second galvonameter driven mirror, said mirrors arranged to be driven along respective axes that are at right angles to each other, a spherical reflector arranged to intercept the reflected light from said first mirror, a convex lens arranged for forming a first focused image of said light source upon the surface of said spherical reflector, said spherical reflector being arranged for continuously reflecting said first focused image of said light source as that image is transversely displaced thereacross by the motion of said first galvanometer mirror and said spherical reflector further arranged to reflect said first focused image toward said second galvanometer mirror, and a light sensitive recording means arranged to intercept the light reflected from said second mirror, and a second convex lens arranged for fousing said first focused image upon said recording means for forming a second focused image thereon, whereby said motion of said first mirror imparts a transverse motion to said first focused image upon said spherical reflector for reflection upon said second mirror and therefrom toward said recording means for producing a transversely moving second focused image thereon and said motion of said second mirror imparts an independent longitudinal displacement to said transversely moving second focused image for forming an X–Y recording on said recording means.

4. A two axis recorder as set forth in claim 3 wherein said galvanometer mirrors are of equal size and proportion with respect to each other.

References Cited by the Examiner

UNITED STATES PATENTS

| | | | |
|---|---|---|---|
| 2,240,028 | 4/1941 | Bader | 346—29 X |
| 2,255,771 | 9/1941 | Golay | 346—29 X |
| 2,692,369 | 10/1954 | Geiser | 346—109 X |

FOREIGN PATENTS

| | | |
|---|---|---|
| 936,152 | 9/1963 | Great Britain. |

RICHARD B. WILKINSON, *Primary Examiner.*

LOUIS J. CAPOZI, *Examiner.*

J. W. HARTARY, *Assistant Examiner.*